United States Patent
Stiehler

(10) Patent No.: US 7,178,999 B2
(45) Date of Patent: Feb. 20, 2007

(54) SHUTTER-OPENING/CLOSING AND SHUTTER-FLASH SYNCHRONIZATION DRIVER FOR DUAL-BLADE SHUTTER IN CAMERA

(75) Inventor: Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 124 days.

(21) Appl. No.: 10/975,867

(22) Filed: Oct. 28, 2004

(65) Prior Publication Data

US 2006/0093350 A1    May 4, 2006

(51) Int. Cl.
G03B 9/22 (2006.01)
G03B 9/70 (2006.01)

(52) U.S. Cl. .................. 396/497; 396/195; 396/500
(58) Field of Classification Search ............. 396/195, 396/180, 441, 497, 500
See application file for complete search history.

(56) References Cited

U.S. PATENT DOCUMENTS

| | | |
|---|---|---|
| 2,537,888 A * | 1/1951 | Fuerst ..................... 396/195 |
| 3,318,217 A | 5/1967 | Ernisse |
| 5,136,324 A | 8/1992 | Tsuboi et al. |
| 5,235,366 A | 8/1993 | Kucmerowski |
| 5,258,797 A | 11/1993 | Oyoshi et al. |
| 5,721,995 A | 2/1998 | Katsura et al. |
| 6,786,657 B2 * | 9/2004 | Dirisio et al. ............. 396/493 |
| 2003/0118331 A1 | 6/2003 | Stiehler et al. |

* cited by examiner

*Primary Examiner*—W. B. Perkey
*Assistant Examiner*—Chia-how Michael Liu
(74) *Attorney, Agent, or Firm*—Robert L. Walker; Roger A. Fields

(57) ABSTRACT

A flash camera has a single-piece shutter-opening/closing and shutter-flash synchronization driver that translates in one direction to pivot a pair of shutter blades away from one another and simultaneously push a movable switch contact of a normally open shutter-flash synchronization switch to close the switch. Then, the movable switch contact is spring-urged to move the switch contact to reopen the shutter-flash synchronization switch and push the single-piece driver in a reverse direction to move the blades towards one another. Movement of the blades away from and towards one another uncovers and recovers an exposure aperture to take a picture.

36 Claims, 8 Drawing Sheets

SHUTTER-OPENING/CLOSING AND SHUTTER-FLASH SYNCHRONIZATION DRIVER FOR DUAL-BLADE SHUTTER IN CAMERA

CROSS REFERENCE TO RELATED APPLICATION

Reference is made to commonly assigned, co-pending application Ser. No. 10/972,806, filed Oct. 25, 2004, entitled SYNCHRONIZING SHUTTER AND FLASH IN CAMERA, in the name of Wayne E. Stiehler.

Reference is made to commonly assigned, co-pending application Ser. No. 10/972,807, filed Oct. 25, 2004, entitled DRIVER FOR OPENING AND CLOSING DUAL-BLADE SHUTTER ADAPTED TO BE RESET WITHOUT RE-OPENING SHUTTER, in the name(s) of Robert Gordon Hills, Michael L. Wirt, and Wayne E. Stiehler.

Reference is made to commonly assigned, co-pending application Ser. No. 10/975,864, filed concurrently herewith, entitled PREVENTING SHUTTER-REBOUND IN CAMERA in the name of Wayne E. Stiehler.

FIELD OF THE INVENTION

The invention relates generally to cameras, and more particularly to shutter operation and shutter-flash synchronization in a camera.

BACKGROUND OF THE INVENTION

Film and cameras that are all in one, commonly referred to as disposable single-use or one-time-use cameras, have become well known. The one-time-use camera is a simple point-and-shoot type camera comprising a conventional film cartridge loaded into a cartridge receiving chamber in a main body part, an unexposed film roll pre-wound from the film cartridge onto a film supply spool in a film supply chamber in the main body part, a film-exposing back-frame opening between the cartridge receiving and film supply chambers, a fixed-focus taking lens, a manually rotatable film winding thumbwheel coaxially engaged with a film winding spool inside the film cartridge for winding the filmstrip after each exposure, a metering lever for locking the thumbwheel, a single-blade shutter, a high energy lever for actuating the shutter blade to make an exposure and for moving the metering lever to unlock the thumbwheel, a manually depressible shutter release button for unlatching the high energy lever, a frame counter wheel that has a numerical scale of frame count indicia and is incrementally rotated to successively view the frame count indicia, a metering sprocket for incrementally rotating the frame counter wheel during film winding, a metering cam coaxially connected to the metering sprocket for controlling movement of the high energy lever and metering lever during film winding, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

To make an exposure on film as in Patent Application Publication US 2003/0118331 A1 published Jun. 26, 2003, the shutter release button is manually depressed. This unlatches the high energy lever, which is then pivoted via a high energy spring to impact against a strike tab on the shutter blade. The shutter blade in turn is pivoted open to uncover an exposure aperture. Once the high energy lever is pivoted beyond the strike tab, a return spring pivots the shutter blade closed to re-cover the exposure aperture. This concludes making the exposure on film.

The high energy spring continues to pivot the high energy lever as the shutter blade is being pivoted closed, in order to cause the high energy lever to pivot the metering lever out of locking engagement with the thumbwheel. The timing is such that once the shutter blade is pivoted closed the thumbwheel is freed to be manually rotated in the film winding direction. Rotation of the thumbwheel rotates the film winding spool inside the film cartridge to wind an exposed frame of the filmstrip from the back-frame opening into the film cartridge and to advance an unexposed frame of the filmstrip from the unexposed film roll to the back-frame opening. The rewinding movement of the filmstrip the equivalent of slightly more than one frame width rotates the metering sprocket in engagement with successive perforations in the filmstrip to incrementally rotate the frame counter wheel to view its next lower-numbered indicia. Also, the metering sprocket rotates the metering cam to return the high energy lever past the strike tab of the shutter blade and so that the high energy spring can hold the high energy lever re-latched or reset. Since the high energy spring is then constrained, a metering spring (which is weaker than the high energy spring) is allowed to return the metering lever to locking re-engagement with the thumbwheel. Alternatively, when there is no metering spring as in U.S. Pat. No. 5,235,366 issued Aug. 10, 1993, the high energy spring returns the metering lever to locking engagement with the thumbwheel.

When the maximum number of frames available on the filmstrip have been exposed and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Synchronizing Shutter Operation and Flash Firing in the Camera

When the one-time-use camera includes an electronic flash, some means must be provided for firing (igniting) the flash in synchronization with pivoting the shutter blade open and closed. Such means typically includes a normally open shutter-flash synchronization switch, which when closed completes the flash ignition circuit to fire the electronic flash, and a separate switch closing member.

One known approach is to use the high energy lever for pivoting the shutter blade open to also move a switch closing member to close the shutter-flash synchronization switch. See U.S. Pat. No. 3,318,217 issued May 9, 1967. When the shutter release button is manually depressed to unlatch the high energy lever, the high energy spring pivots the high energy lever against the switch closing member to rotate the switch closing member. The shutter closing member rotates against one leaf spring contact to bend that contact against another leaf spring switch contact, to close the shutter-flash synchronization switch. The high energy spring continues to pivot the high energy lever to swing the high energy lever beyond the switch closing member, and then against a strike tab on the shutter blade to pivot the shutter blade open. Once the shutter blade is pivoted open, a first return spring pivots the shutter blade closed. Separately, a second return spring reverses the shutter closing member to separate it from the bent leaf spring switch contact, allowing that contact to straighten in order to reopen the shutter-flash synchronization switch. Since the switch closing member when returned is in the way of the high energy member, the shutter closing member is provided with an inclined edge that allows the high energy member to rotate the shutter closing member temporarily out of the way of the high energy lever. This permits the high energy lever to be returned past the switch closing member to be re-latched or reset.

Dual-Blade Center-Opening Shutters

The matter of shutter-flash synchronization becomes more complex when a dual blade shutter is used instead of a single-blade shutter. Generally, dual-blade shutters are center-opening, i.e. the two blades pivot open in opposite directions away from one other to uncover the exposure aperture and return to an overlapping closed relation to re-cover the exposure aperture. As in U.S. Pat. No. 5,136,324 issued Aug. 4, 1992, No. 5,258,797 issued Nov. 2, 1993, and No. 5,721,995 issued Feb. 24, 1998, individual fixed pivot-support posts project into respective round pivot holes in the two blades, and a rotatable or pivotable shutter driver for opening and closing the two blades projects into respective overlapping slots in the two blades. Pivoting of the shutter driver in one direction within the overlapping slots pivots the two blades about the pivot-support posts to open, and pivoting of the shutter driver in an opposite direction within the overlapping slots pivots the two blades about the pivot-support posts to close.

The Cross-Referenced Application

The cross-referenced application discloses a camera that includes an electronic flash and has a spring-driven high energy lever for striking a shutter driver to rotate the shutter driver, to pivot a dual-blade center-opening shutter open, and for striking a switch closing member to translate the switch closing member, to close a normally open shutter-flash synchronization switch. When the high energy pivots beyond the shutter driver, a return spring translates the shutter driver to return. When the high energy lever pivots beyond the switch closing member, the shutter-flash synchronization switch reopens and translates the switch closing member to return. Then, during film winding a metering cam is rotated to return the high energy lever past the switch closing member and the shutter driver. The switch closing member is supported to be pivoted temporarily out of the way of the high energy lever, and the shutter driver is supported to be translated temporarily out of the way of the high energy lever, to allow the high energy lever to be returned past the switch closing member and the shutter driver.

SUMMARY OF THE INVENTION

According to one aspect of the invention a camera comprising an exposure aperture, a shutter that is movable open and closed to uncover and re-cover the exposure aperture, an electronic flash that is fired to provide flash illumination, a normally open shutter-flash synchronization switch that is closed to synchronize shutter opening and firing of an electronic flash, and a high energy striker that is movable for inducing the shutter to open and the shutter-flash synchronization switch to close, is characterized in that:

the shutter has a pair of blades that are supported for movement away from one another to open the shutter and for movement towards one another to re-close the shutter;

a single-piece driver is supported for movement to move the blades away from one another and close the shutter-flash synchronization switch and for return to permit the shutter-flash synchronization switch to reopen and move the blades towards one another; and the high energy striker is supported to strike the single-piece driver to move the single-piece driver to move the blades away from one another and close the shutter-flash synchronization switch.

Preferably, a metal return spring conductively connects the electronic flash and the shutter-flash synchronization switch and urges the shutter-flash synchronization switch to reopen to push the single-piece driver to return to move the blades towards one another.

According to another aspect of the invention a camera comprising an exposure aperture, and a dual-blade center-opening shutter having a pair of blades that pivot away from one another and towards one another to uncover and re-cover the exposure aperture, is characterized in that:

respective fixed pivot-support posts project into respective pivot holes in the blades to support the blades to pivot away from and towards one another; and a single-piece driver has respective drive posts that project into drive slots in the blades and is supported for translation in a single forward direction to pivot the blades away from one another and for translation in a single reverse direction to pivot the blades towards one another.

According to another aspect of the invention a camera comprising an exposure aperture, a pair of center-opening shutter blades that when moved away from one another to uncover the exposure aperture form a substantially rectangular center-opening having a center-point that is aligned with a center-line of the exposure aperture, and respective pivot-support post that support the blades to move away from one another and form the substantially rectangular center-opening, is characterized in that:

the pivot-support posts are arranged relative one another and the center-point in order that a diagonal straight-line extending through opposite corners of the substantially rectangular center-opening intersects the center-point and the pivot-support posts.

DETAILED DESCRIPTION OF THE INVENTION

The invention is disclosed as preferably being embodied in a one-time-use flash camera. Since the elements of a one-time-use flash camera are generally known, the description that follows is directed mostly to those elements forming part of or cooperating with the invention. It is understood that those elements not disclosed may take various forms known to persons of ordinary skill in the camera arts.

Figure 1:
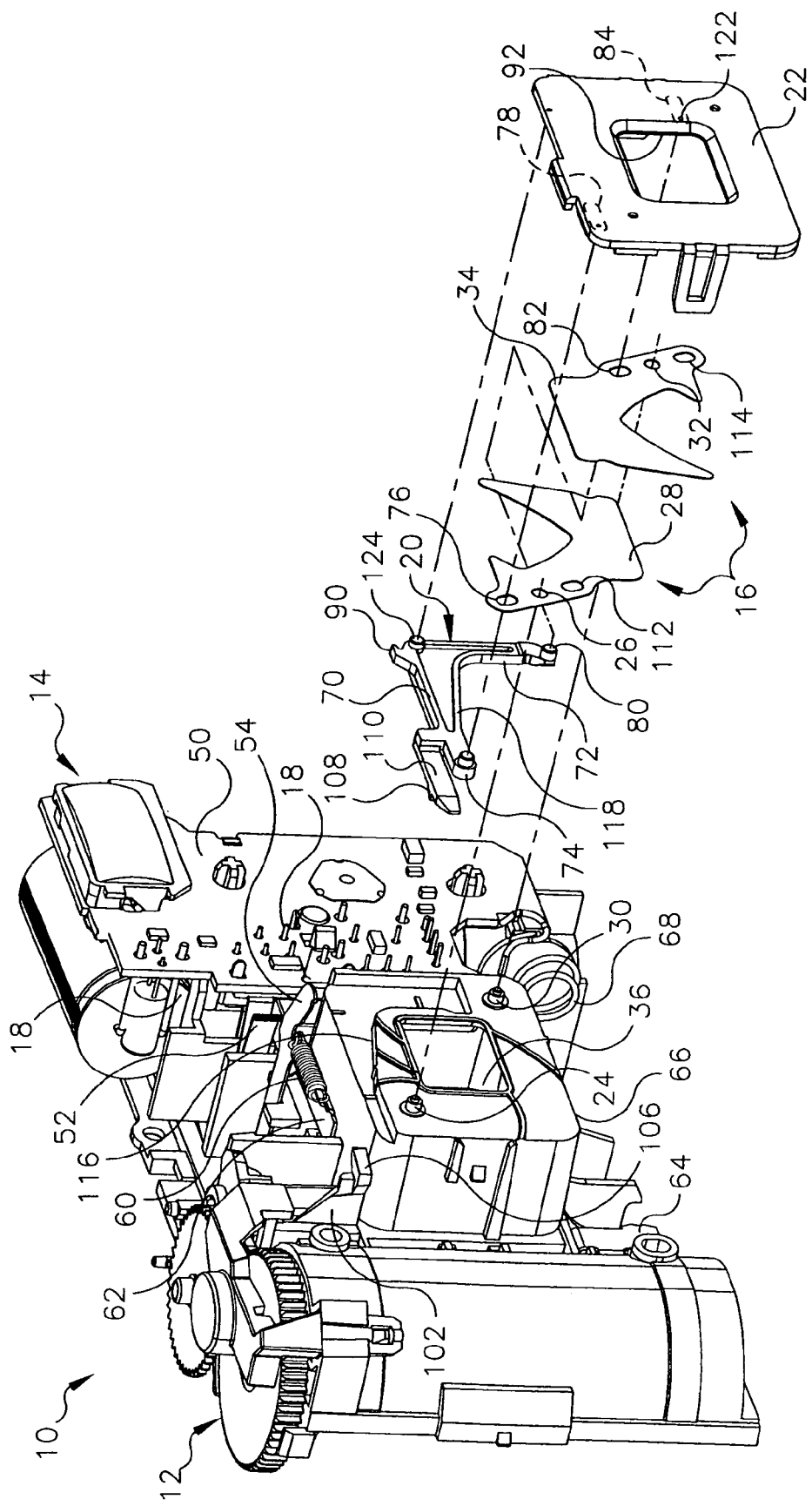
FIG. 1 is an exploded perspective view of a flash camera including a shutter-opening/closing and shutter-flash synchronization driver for a dual-blade center-opening shutter and a shutter-flash synchronization switch, according to a preferred embodiment of the invention.
Figure 9:
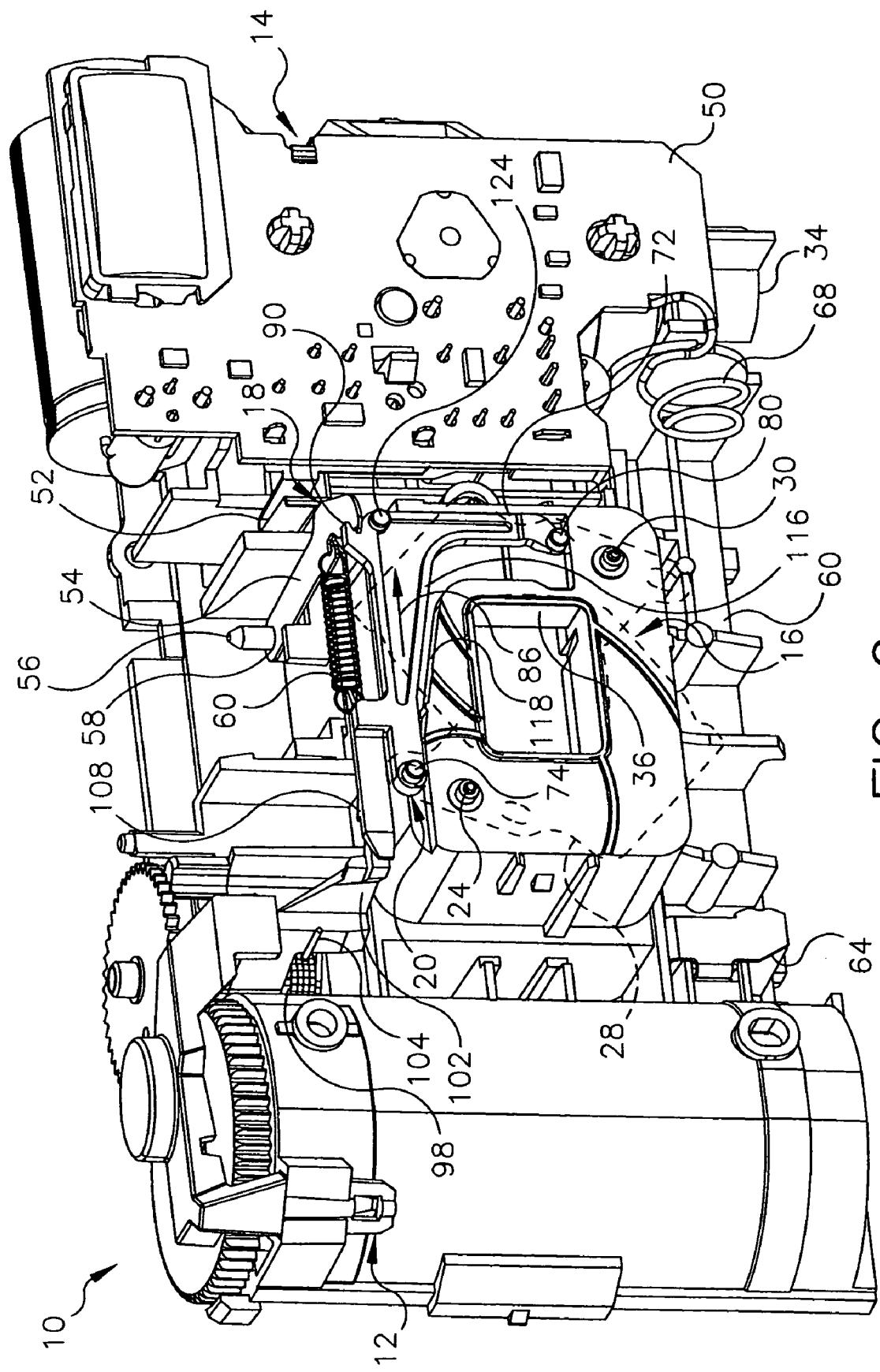
FIG. 9 is an assembled perspective view of the flash camera depicted in FIG. 1, showing the shutter open and the switch closed.
Figure 10:
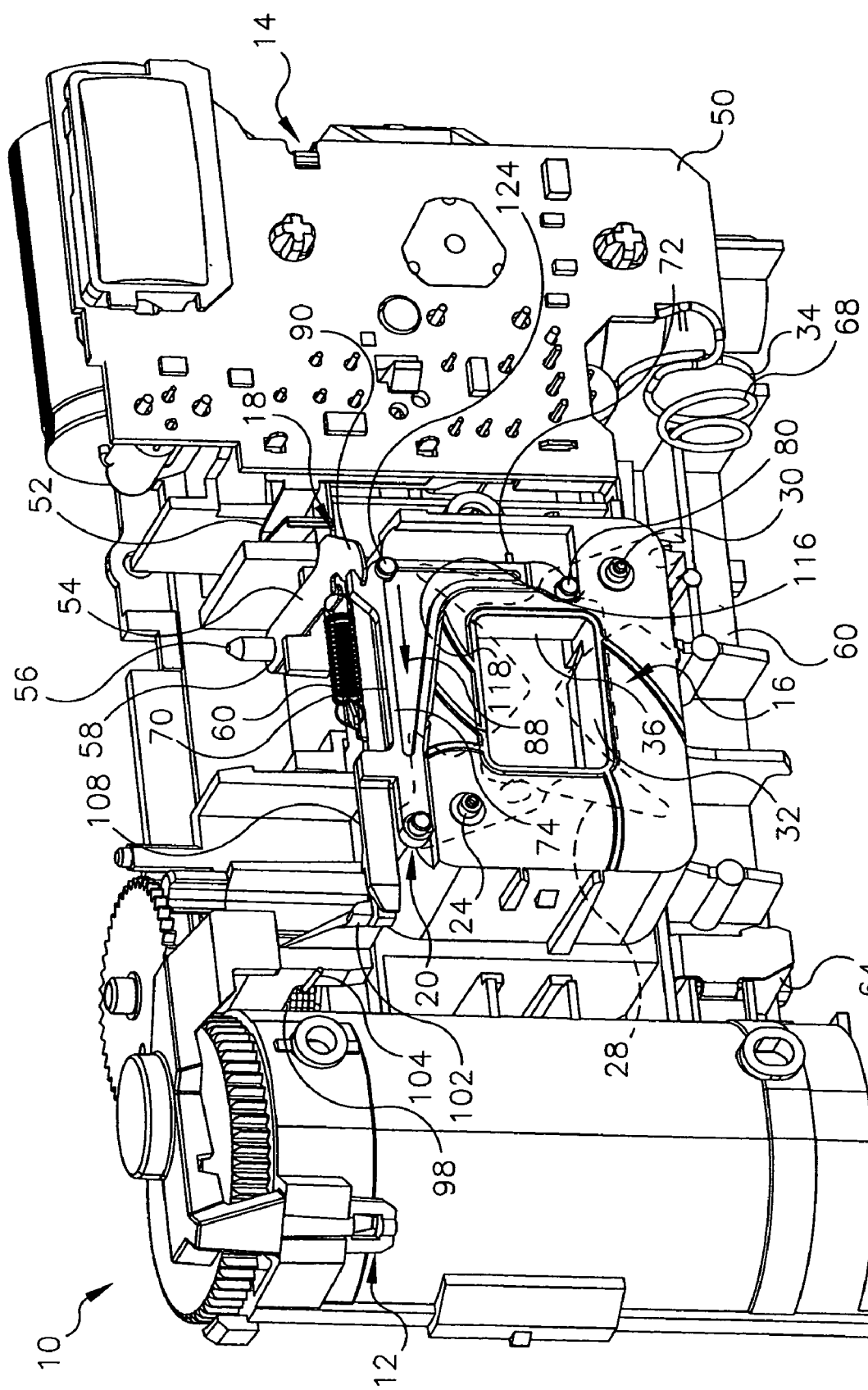
FIG. 10 is an assembled perspective view of the flash camera depicted in FIG. 1, showing the shutter closed and the switch open.

Referring now to the drawings and in particular to FIGS. 1, 9 and 10, there is shown a partially depicted one-time-use camera 10 including a main body part 12, an electronic flash 14, a dual-blade center-opening shutter 16, a normally shutter-flash synchronization switch 18 that is closed to synchronize shutter-opening and flash-firing, an L-shaped driver or slider 20 for opening an closing the dual-blade shutter and for closing the shutter-flash synchronization switch, and a face plate 22.

Figure 3:
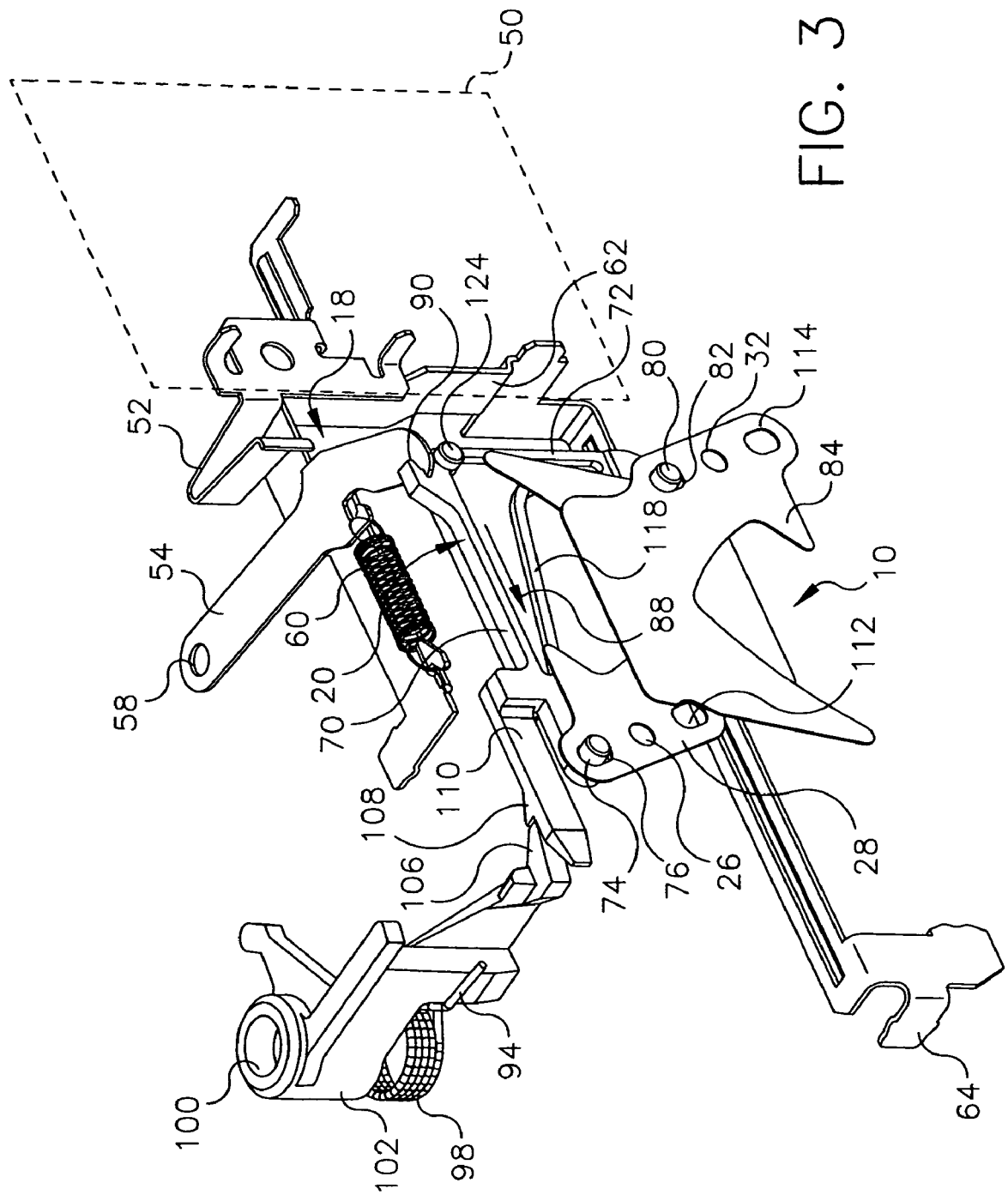
FIG. 3 is an assembled perspective view of the driver, the dual-blade shutter, and the shutter-flash synchronization switch depicted in FIG. 2, showing the shutter closed and the switch open.
Figure 4:
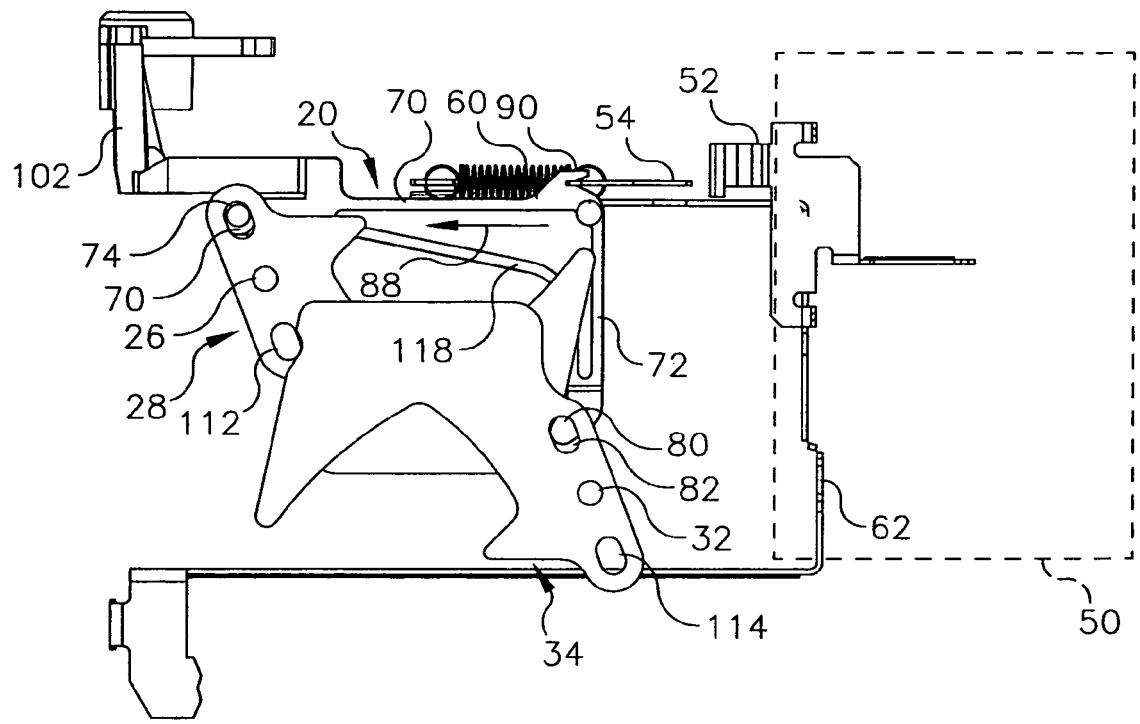
FIG. 4 is a front elevation view similar to FIG. 3.
Figure 5:
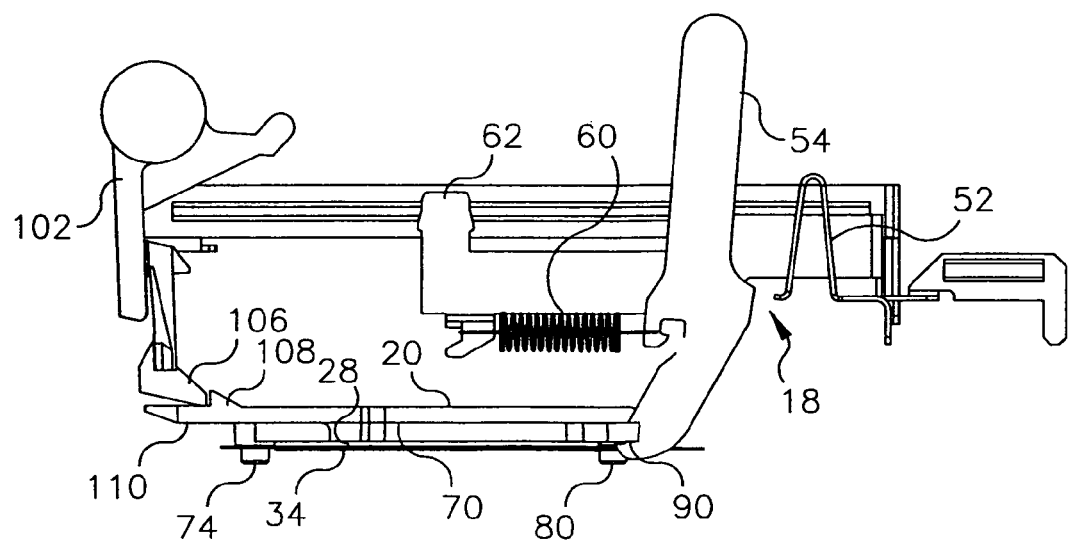
FIG. 5 is a top plan view similar to FIG. 3

As shown in FIGS. 1, 9 and 10, a fixed round pivot-support post 24 on the main body part 12 projects forward into a round pivot hole 26 in a first shutter blade 28 of the dual-blade center-opening shutter 16, and a fixed round pivot-support post 30 on the main body part projects forward into a round pivot hole 32 in a second shutter blade 34 of the dual-blade shutter. The first and second shutter blades 28 and 34 are thin, and are plastic to be electrically non-conductive. The pivot-support posts 24 and 30 support the first and second shutter blades 28 and 34 for opening (parallel-axis) movement away from one another, i.e. clockwise and counter clockwise about the pivot-support posts in FIGS. 6, 7 and 10, to uncover a rectangular exposure aperture 36 in the main body part 12. Also, the pivot-support posts 24 and 30 support the first and second blades 28 and 34 for return or reverse closing (parallel-axis) movement towards one another, i.e. counterclockwise and clockwise about the pivot-support posts in FIGS. 3, 4 and 9, to recover the exposure aperture 36.

Figure 6:
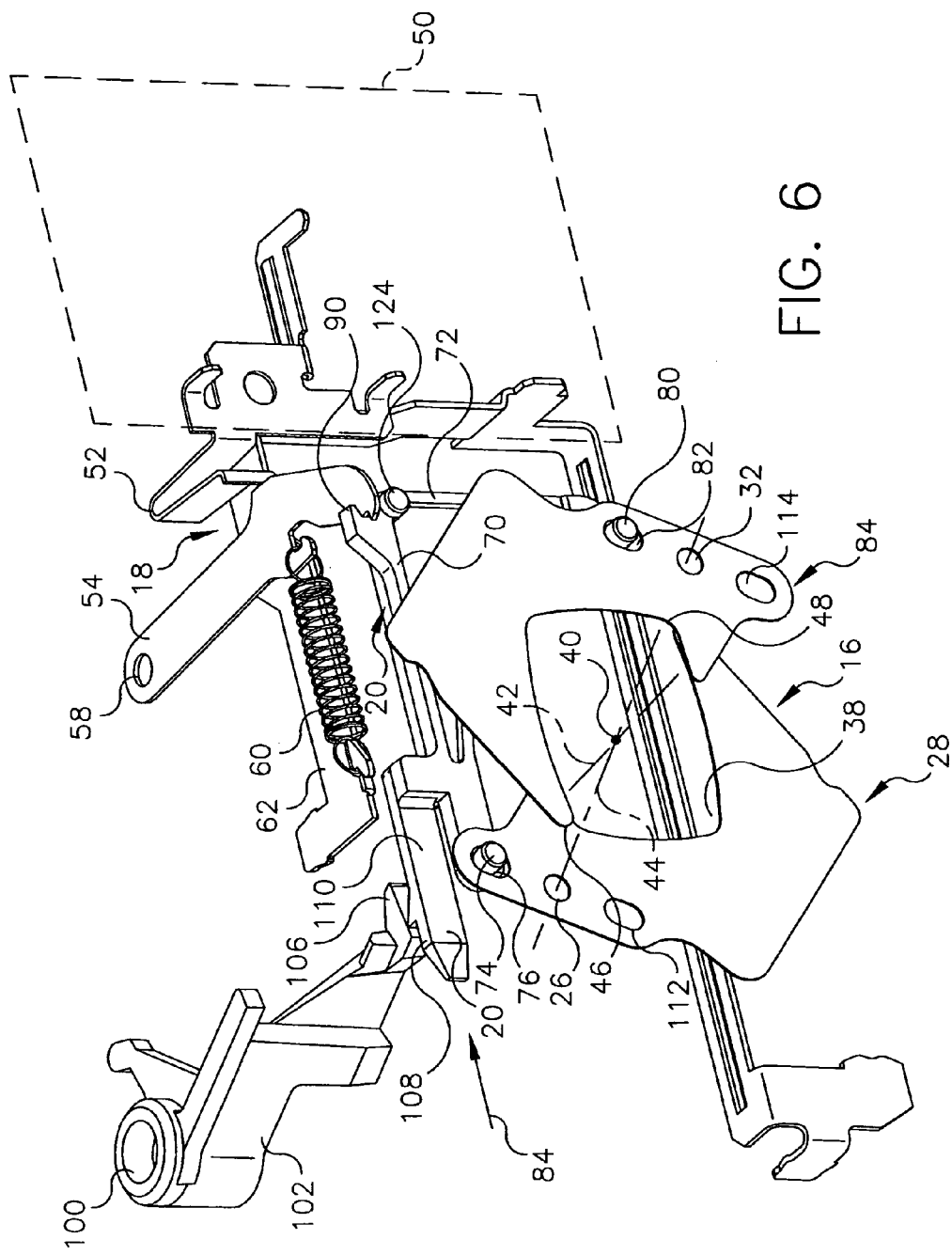
FIG. 6 is an assembled perspective view of the driver, the dual-blade shutter, and the shutter-flash synchronization switch depicted in FIG. 2, showing the shutter open and the switch closed
Figure 7:
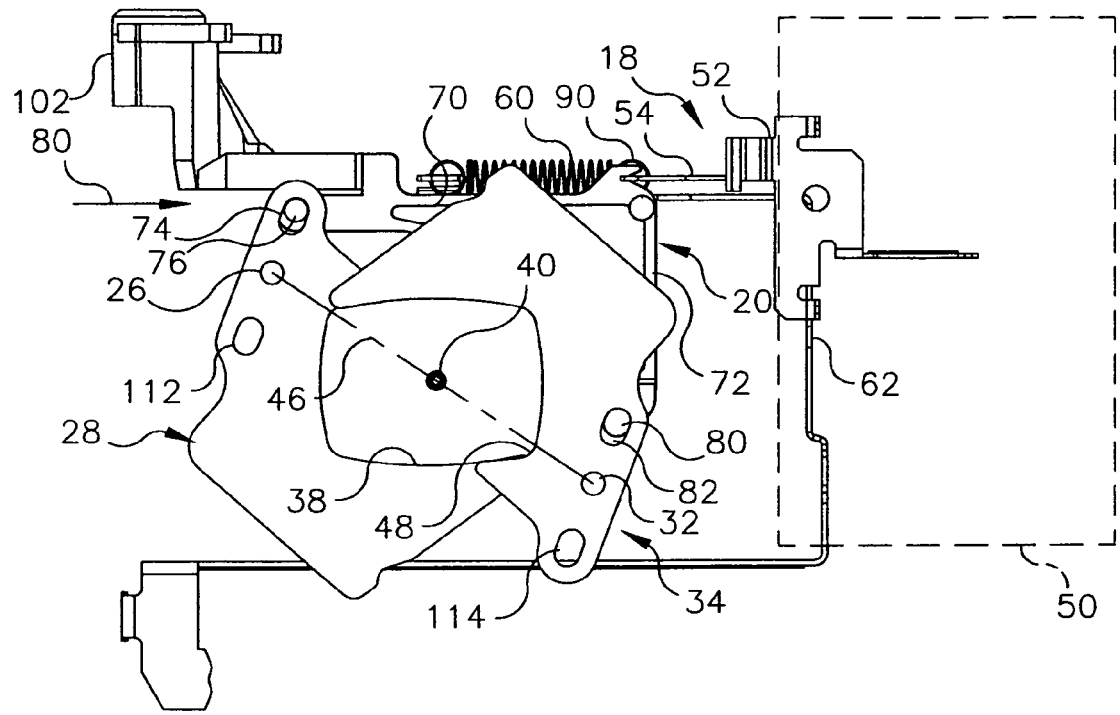
FIG. 7 is a front elevation view similar to FIG. 6.

When the first and second blades 28 and 34 of the dual-blade center-opening shutter 16 are moved away from one another to uncover the exposure aperture 36, they form a substantially rectangular center-opening 38 over the exposure aperture. As shown in FIGS. 6 and 7, the center-opening 38 has a center-point 40 that is aligned with a center-line 42 of the exposure aperture 36. As is known in the prior art, the center-line 42 of the exposure aperture 36 is coincident with an optical axis of a picture-taking lens (not shown). The pivot-support posts 24 and 30 are arranged relative one another and the center-point 40 so that, if a diagonal straight-line 44 is drawn through two opposite corners 46 and 48 of the center-opening 38, the diagonal straight-line would intersect the center-point and the pivot-support posts. In FIGS. 6 and 7, the corners 46 and 48 are located upper-right and lower-left.

As shown in FIGS. 1, 9 and 10, the electronic flash 14 has a flash circuit board 50 for flash-firing when the shutter-flash synchronization switch 18 is closed. The shutter-flash synchronization switch 18 is part of a flash-firing circuit on the flash circuit board 50 and includes a leaf-spring positive switch contact 52 and a movable negative switch contact 54. A fixed round pivot-support post 56 on the main body part 12 projects upward into a round pivot hole 58 in the movable switch contact 54 to support the movable switch contact for pivotable movement, i.e. counterclockwise about the pivot-support post in FIGS. 6–8 and 9, against the leaf-spring switch contact 52 to close the shutter-flash synchronization switch 18, and for return or reverse pivotable movement, i.e. clockwise about the pivot-support post in FIGS. 3–5 and 10, away from the leaf-spring switch contact to reopen the shutter-flash synchronization switch. A metal helical-tension return spring 60 has opposite ends conductively interconnecting the movable switch contact 54 and a fixed thin metal strip 62 mounted on the main body part 12. The return spring 60 urges or biases the movable switch contact 54 away from the leaf-spring switch contact 52 to separate the movable switch contact from the leaf-spring switch contact. The metal strip 62 has one end 64 that protrudes into a battery chamber 66 in the main body part 12 to serve as a negative battery contact. A helical compression spring 68 conductively connected to the flash circuit board 50 protrudes into the battery chamber 66 to serve as a positive battery contact.

Figure 2:
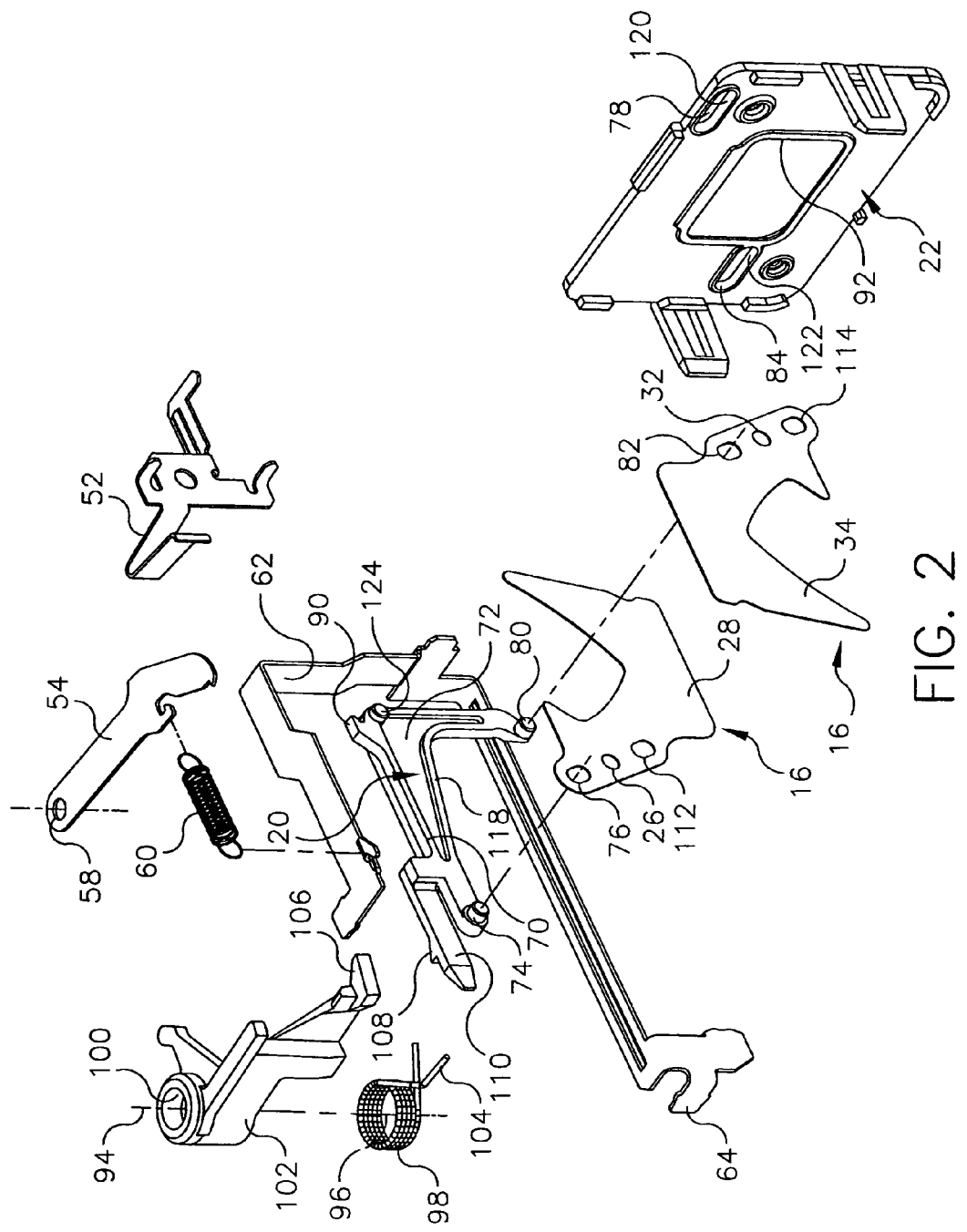
FIG. 2 is an exploded perspective view of the driver, the dual-blade shutter, and the shutter-flash synchronization switch.

The L-shaped driver or slider 20 for opening and closing the dual-blade shutter 16 and for closing the shutter-flash synchronization switch 18 is a single-piece plastic construction and has a pair of substantially right-angle horizontal and vertical driver legs 70 and 72 that essentially provide the L-shape. As shown in FIGS. 1 and 2, the horizontal driver leg 70 has a fixed round blade-drive post 74 that protrudes forward through a elongate drive slot 76 in the first shutter blade 28 and into a straight translation-support slot 78 in the face plate 22, and the vertical driver leg 72 has a fixed round blade-drive post 80 that protrudes forward through an elongate drive slot 82 in the second shutter blade 34 and into a straight translation-support slot 84 in the face plate. The translation-support slots 78 and 84 in the face plate 22 support the L-shaped driver 20 for translation to advance the L-shaped driver in a single forward direction 86, to cause the blade-drive posts 74 and 80 to pivot the first and second shutter blades 28 and 34 away from one another, i.e. clockwise and counter clockwise about the pivot-support posts 24 and 30 in FIGS. 6, 7 and 10, to uncover the exposure aperture 36. Also, the translation support slots 78 and 84 support the L-shaped driver 20 for translation to return the L-shaped driver in a single reverse direction 88, to cause the blade-drive posts 74 and 80 to pivot the first and second shutter blades 28 and 34 towards one another, i.e. counterclockwise and clockwise about the pivot-support posts in FIGS. 3, 4 and 9, to recover the exposure aperture 36. Thus, the blade-drive post 74 in the drive slot 76 and the blade-drive post 80 in the drive slot 82 are post-in-slot driving connections, and the blade-drive post 74 in the translation-support slot 78 and the blade-drive post 80 in the in the translation-support slot 84 are post-in-slot supporting connections.

When the L-shaped driver 20 is translated in the single forward direction 86, an upstanding switch drive finger 90 on the horizontal driver leg 70 pushes against the movable switch contact 54 (in opposition to the urging of the return spring 60) to pivot the movable switch contact, i.e. counterclockwise about the pivot-support post 56 in FIGS. 6–9, against the leaf-spring switch contact 52 to close the shutter-flash synchronization switch 18. The shutter-flash synchronization switch 18 is closed at the same time that the blade-drive posts 74 and 80 pivot the first and second shutter blades 28 and 34 away from one another to uncover the exposure aperture 36.

Since the return spring 60 urges or biases the movable switch contact 54 to pivot away from the leaf-spring switch contact 52, i.e. clockwise about the pivot-support post 56 in FIGS. 3–5 and 10, to re-close the shutter-flash synchronization switch 18, the return spring pulls the movable switch contact continuously against the switch drive finger 90. This allows the movable switch contact 54, which will be described below, to push against the switch drive finger 90 in order for the movable switch contact to translate the L-shaped driver 20 in the single reverse direction 88, to cause the blade-drive posts 74 and 80 to pivot the first and second shutter blades 28 and 34 towards one another to recover the exposure aperture 36.

The face plate 22 is mounted on the main body part 12 and has a rectangular plate opening 92 that is aligned with the exposure aperture 36. As depicted in FIG. 1, the face plate 22 partially covers the first and second shutter blades 28 and 34.

Shutter-Opening/Closing and Shutter-Flash Synchronization

A fixed round pivot-support post 94 on the main body part 10 projects upward from the main body part 12 in FIG. 1, through a center-coil opening 96 in a high energy spring 98 and into a round pivot hole 100 in a high energy lever 102 in FIG. 2. A horizontal spring leg 104 of the high energy spring 98 urges the high energy lever 102 to pivot or swing counterclockwise about the pivot-support post 94 as in FIGS. 6–9. As is known in the prior art, the high energy lever 102 is normally latched in place in an initial or home position shown in FIGS. 3–5 and 10.

To make an exposure on film, a shutter release button (not shown) is manually depressed to unlatch the high-energy lever 102 as is known in the prior art. The high energy lever 102 is then pivoted counterclockwise about the pivot-support post 94 in FIGS. 6–9, via the horizontal spring leg 104 of the high energy spring 98. A striker finger 106 on the high energy lever 102 swiftly impacts against (strikes) a strike tab 108 on a resilient cantilever beam 110 extending from the horizontal driver leg 70 of the L-shaped driver 20, to quickly translate the L-shaped driver in the single forward direction 86. As a result, the L-shaped driver is advanced to cause the blade-drive posts 74 and 80 to pivot the first and second shutter blades 28 and 34 away from one another, i.e. clockwise and counter clockwise about the pivot-support posts 24 and 30 in FIGS. 6, 7 and 10, to uncover the exposure aperture 36, and to cause the upstanding switch drive finger 90 on the horizontal driver leg 70 to push the movable switch contact 54 (in opposition to the urging of the return spring 60) to pivot the movable switch contact, i.e. counterclockwise about the pivot-support post 56 in FIGS. 6–9, against the leaf-spring switch contact 52 to close the shutter-flash synchronization switch 18. The shutter-flash synchronization switch 18 is closed at the same time that the blade-drive posts 74 and 80 pivot the first and second shutter blades 28 and 34 away from one another to uncover the exposure aperture 36.

Figure 8:
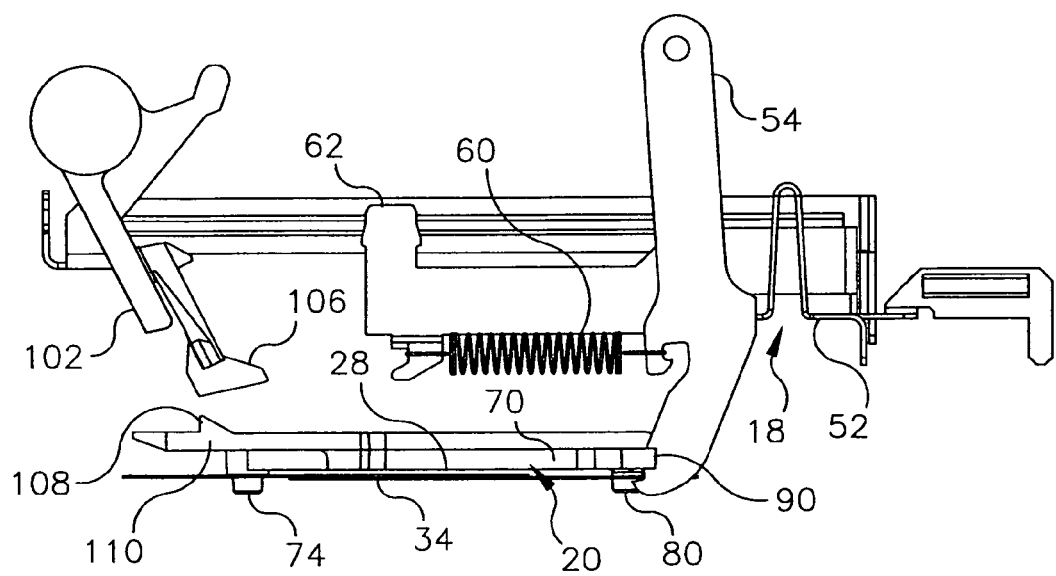
FIG. 8 is a top plan view similar to FIG. 6

As shown in FIGS. 6–8, after the striker finger 106 on the high energy lever 102 strikes the strike tab 108 on the resilient cantilever beam 110, the striker finger swings slightly beyond the strike tab. This allows the return spring 60 to pivot the movable switch contact 54 away from the leaf-spring switch contact 52, i.e. clockwise about the pivot-support post 56 in FIGS. 3–5 and 10, to re-close the shutter-flash synchronization switch 18. The movable switch contact 54 pushes against the switch drive finger 90 on the L-shaped driver 20 to translate the L-shaped driver in the single reverse direction 88, which causes the blade-drive posts 74 and 80 to pivot the first and second shutter blades 28 and 34 towards one another to recover the exposure aperture 36.

Then, as is known in the prior art a metering cam (not shown) is manually rotated during film rewinding to return the high energy lever 102 to its initial or home position by pivoting the high energy lever clockwise about the pivot-support post 94 in FIGS. 3–5 and 10 (in opposition to the urging of the horizontal leg 104 of the high energy spring 98). As the striker finger 106 on the high energy lever 102 is being returned past the strike tab 108 on the resilient cantilever beam 110, the beam is temporarily or momentarily deflected or bent to shift the strike tab out of the way of the striker finger. This is done without moving the L-shaped driver 20. Once the striker finger 106 is returned past the strike tab 108, the resilient cantilever beam 110 elastically straightens.

Interchangeability of the Shutter Blades

The first and second shutter blades 28 and 34 are exactly identical to make them readily interchangeable as shown in FIG. 1, for ease of manufacture of the camera 10. For this purpose, the first blade 28 has an unused drive slot 112 that is aligned with and below the pivot hole 26 and the used drive slot 76 in the first shutter blade, and the second blade 34 has an unused drive slot 114 that is aligned with and below the pivot hole 32 and the used drive slot 82 in the second shutter blade. See FIGS. 1 and 2. The unused drive slots 112 and 114 are spaced the same distance from the pivot holes 26 and 32, as are the used drive slots 76 and 82 spaced from the pivot holes.

Preventing Shutter-Rebound or Shutter-Bounce

As shown in FIGS. 1, 9 and 10, the main body part 12 and the L-shaped driver or slider 20 have parallel similarly-inclined ramp and follower faces 116 and 118. Preferably, the ramp and follower faces 116 and 118 are each flat and are each inclined at an acute angle within the range of 9°–15° (preferably 11.8°). The ramp face 116 serves as a fixed stop for the L-shaped driver 20 in FIG. 10.

When the L-shaped driver 20 is translated in the single reverse direction 88 to cause the blade-drive posts 74 and 80 on the L-shaped driver to pivot the first and second shutter blades 28 and 34 towards one another to recover the exposure aperture 36, the follower face 118 on the L-shaped driver is moved to abut against the ramp face 116 on the main body part 12 as in FIGS. 9–10. The ramp face 116, in cooperation with the follower face 118, stops the L-shaped driver 20 and due to its incline tends to urge or cam or lift the L-shaped driver slightly upward in FIG. 10 to create a high friction-type relation between the blade-drive post 74 on the L-shaped driver and a peripheral edge or surface 120 of the translation-support slot 78 in the face plate 22 and between the blade drive post 80 on the L-shaped driver and a peripheral edge or surface 122 of the translation-support slot 84 in the face plate. The friction-type relation is created because the blade-drive post 74 is urged firmly against the peripheral edge 120 and the blade drive post 80 is urged firmly against the peripheral edge 122. This then acts to impede or retard translation of the L-shaped driver 20 in the single forward direction 86, that would cause the blade-drive posts 74 and 80 to pivot the first and second shutter blades 28 and 34 away from one another to unintentionally uncover the exposure aperture 36. Thus, there can be no shutter-round or shutter-bounce.

The invention has been described in detail with particular reference to certain preferred embodiments thereof, but it will be understood that variations and modifications can be effected within the spirit and scope of the invention. For example, the single-piece driver 20 is shown in FIGS. 1 and 2 with an optional driver-support post 124 that projects forward to rest on the face plate 22. The driver-support post 124 is slightly shorter than the blade-drive posts 74 and 80 on the single-piece driver 20.

The invention claimed is:

1. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:
   said shutter has a pair of blades that are supported for movement away from one another to open said shutter and for movement towards one another to re-close said shutter;
   a single-piece driver is supported for movement to move said blades away from one another and close said shutter-flash synchronization switch and for return to permit said shutter-flash synchronization switch to reopen and move said blades towards one another; and
   said high energy striker is supported to strike said single-piece driver so that when the high energy striker strikes the single-piece driver only the impact of the high energy striker against the single-piece driver moves said single-piece driver to move said blades away from one another to open said shutter to uncover said exposure aperture and also moves said single-piece driver to close said shutter-flash synchronization switch.

2. A camera as recited in claim 1 wherein said single-piece driver moves said blades away from one another and closes said shutter-flash synchronization switch at the same time.

3. A camera as recited in claim 1 wherein said high energy striker strikes said single-piece driver only once to move said single-piece driver to move said blades away from one another and close said shutter-flash synchronization switch.

4. A camera as recited in claim 1 wherein a metal return spring conductively connects said electronic flash and said shutter-flash synchronization switch and urges said shutter-flash synchronization switch to reopen to push said single-piece driver to return to move said blades towards one another.

5. A camera as recited in claim 1 wherein said blades are completely identical to make them interchangeable.

6. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:
   said shutter has a pair of blades that are supported for movement away from one another to open said shutter and for movement towards one another to re-close said shutter;
   a single-piece driver is supported for movement to move said blades away from one another and close said shutter-flash synchronization switch and for return to permit said shutter-flash synchronization switch to reopen and move said blades towards one another; and
   said high energy striker is supported to strike said single-piece driver to move said single-piece driver to move said blades away from one another and close said shutter-flash synchronization switch, and
   wherein said single-piece driver is supported to be advanced linearly to move said blades away from one another and close said shutter-flash synchronization switch.

7. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:
   said shutter has a pair of blades that are supported for movement away from one another to open said shutter and for movement towards one another to re-close said shutter;
   a single-piece driver is supported for movement to move said blades away from one another and close said shutter-flash synchronization switch and for return to permit said shutter-flash synchronization switch to reopen and move said blades towards one another; and
   said high energy striker is supported to strike said single-piece driver to move said single-piece driver to move said blades away from one another and close said shutter-flash synchronization switch, and wherein said single-piece driver is supported to be returned linearly to permit said shutter-flash synchronization switch to reopen and move said blades towards one another.

8. A camera as recited in claim 7 wherein said shutter-flash synchronization switch has a movable switch contact that is moved to close and reopen said shutter-flash synchronization switch, said single-piece driver is advanced against said switch contact to push said switch contact to close said shutter-flash synchronization switch, and a metal return spring is conductively connected to said switch contact and said electronic flash to urge said switch contact to move to reopen said shutter-flash synchronization switch and push said single-piece driver to return to move said blades towards one another.

9. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:
   said shutter has a pair of blades that are supported for movement away from one another to open said shutter and for movement towards one another to re-close said shutter;
   a single-piece driver is supported for movement to move said blades away from one another and close said shutter-flash synchronization switch and for return to permit said shutter-flash synchronization switch to reopen and move said blades towards one another; and said high energy striker is supported to strike said single-piece driver to move said single-piece driver to move said blades away from one another and close said shutter-flash synchronization switch, and wherein said single-piece driver is supported to translate linearly in a forward direction to move said blades away from one another and close said shutter-flash synchronization switch and to translate linearly in a reverse direction to permit said shutter-flash synchronization switch to reopen and move said blades towards one another.

10. A camera as recited in claim 9 wherein said blades are supported on respective fixed pivot-support posts to swing open away from one another and towards one another, and said single-piece driver has respective drive posts that project through respective slots in said blades to swing said blades about said pivot-support posts away from one another and towards one another when said single-piece driver is translated in the forward and reverse directions.

11. A camera as recited in claim 10 wherein a face plate partially covers said blades and has respective translation-support slots, and said drive posts project into said translation-support slots to support said single-piece driver to translate in the forward and reverse directions.

12. A camera as recited in claim 10 wherein said exposure aperture has a center-line, said blades when moved away from one another form a substantially rectangular opening having a center-point that is aligned with the center-line of said exposure aperture, and said fixed pivot-support posts are arranged relative one another and the center-point in order that a diagonal straight-line extending through opposite corners of the substantially rectangular opening intersects the center-point and said pivot-support posts.

13. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:

said shutter has a pair of blades that are supported for movement away from one another to open said shutter and for movement towards one another to re-close said shutter;

a single-piece driver is supported for movement to move said blades away from one another and close said shutter-flash synchronization switch and for return to permit said shutter-flash synchronization switch to reopen and move said blades towards one another; and said high energy striker is supported to strike said single-piece driver to move said single-piece driver to move said blades away from one another and close said shutter-flash synchronization switch, and wherein said single-piece driver has a strike tab that is struck by said high energy lever to move said single-piece driver to move said blades away from one another and close said shutter-flash synchronization switch, said high energy lever is supported to be reset after striking said strike tab by returning past said strike tab, and wherein said strike tab is resiliently mounted on said single-piece driver to allow said high energy lever to be returned past said strike tab by temporarily deflecting said strike tab without moving said single-piece driver.

14. A camera comprising: an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of said electronic flash, and a high energy striker that is movable for inducing said shutter to open and said shutter-flash synchronization switch to close, wherein:

said shutter has a pair of blades that are supported for movement away from one another to open said shutter and for movement towards one another to re-close said shutter;

a single-piece driver is supported for movement to move said blades away from one another and close said shutter-flash synchronization switch and for return to permit said shutter-flash synchronization switch to reopen and move said blades towards one another; and said high energy striker is supported to strike said single-piece driver to move said single-piece driver to move said blades away from one another and close said shutter-flash synchronization switch, and wherein said single-piece driver is an L-shaped slider having a pair of substantially right-angle legs with respective shutter drive members positioned on said legs for moving said blades away from one another and towards one another and with a switch drive member positioned on only one of said legs for closing said shutter-flash synchronization switch.

15. A camera as recited in claim 14, wherein said L-shaped slider has a strike tab that is struck by said high energy lever to move said L-shaped slider to move said blades away from one another and close said shutter-flash synchronization switch, said high energy lever is supported to be reset after striking said strike tab by returning past said strike tab, and wherein said strike tab is mounted on a resilient beam extending from said leg that has said switch drive member and one of said shutter drive members to allow said high energy lever to be returned past said strike tab by temporarily deflecting said strike tab without moving said L-shaped driver.

16. A camera as recited in claim 13 wherein a face plate partly covers said blades and has respective translation-support slots, and said shutter drive members project into said translation-support slots to support said single-piece driver for translation to move said blades away from one another and close said shutter-flash synchronization switch and to permit said shutter-flash synchronization switch to reopen and move said blades towards one another.

17. A camera comprising an exposure aperture, a shutter that is movable open and closed to uncover and re-cover said exposure aperture, an electronic flash that is fired to provide flash illumination, a normally open shutter-flash synchronization switch that is closed to synchronize shutter opening and firing of an electronic flash, and a high energy striker that is movable for inducing said shutter to open and said shutter-flash synchronization switch to close, is characterized in that:

said shutter has a pair of blades supported for movement away from one another to open said shutter and for movement towards one another to re-close said shutter;

said shutter-flash synchronization switch has a movable switch contact that is moved to close and reopen said shutter-flash synchronization switch;

a single-piece driver is supported for movement to move said blades away from one another and push said switch contact to close said shutter-flash synchronization switch and for return to permit said switch contact to reopen said shutter-flash synchronization switch and push said single-piece driver to move said blades towards one another;

said high energy striker is supported to strike said single-piece driver to move said single-piece driver to move said blades away from one another and push said switch contact to close said shutter-flash synchronization switch; and a return spring is conductively connected to said switch contact and said electronic flash to urge said switch contact to reopen said shutter-flash synchronization switch and push said single-piece driver to return.

18. A camera comprising an exposure aperture, a pair of center-opening shutter blades that when moved away from one another to uncover said exposure aperture form a substantially rectangular center-opening having a center-point that is aligned with a center-line of said exposure aperture, and respective pivot-support posts that support said blades to move away from one another and form the substantially rectangular center-opening, is characterized in that:

said pivot-support posts are arranged relative one another and the center-point in order that a diagonal straight-line extending through opposite corners of the substantially rectangular center-opening intersects the center-point and said pivot-support posts.

19. A method of opening and closing a dual-blade center-opening shutter by moving a pair of blades towards and away from one another to open and re-close the shutter, and of closing and reopening a shutter-flash synchronization switch to synchronize shutter operation and flash firing, said method comprising:

linearly translating a single-piece driver in a single forward direction to move the blades away from one another and push the shutter-flash synchronization switch to close; and permitting the shutter-flash synchronization switch to reopen and push the single-piece driver linearly in a single reverse direction to translate the single-piece driver to move the blades towards one another.

20. A method as recited in claim 19 wherein a high energy striker strikes the single-piece driver only once to translate the single-piece driver in the single forward direction to move the blades away from one another and push the shutter-flash synchronization switch to close.

21. A method as recited in claim 19 wherein a metal return spring conductively connecting an electronic flash and the shutter-flash synchronization switch urges the shutter-flash synchronization switch to reopen to push the single-piece driver in the single reverse direction to translate the single-piece driver to move the blades towards one another.

22. A camera comprising:

an exposure aperture; and a dual-blade center-opening shutter having a pair of blades that pivot away from one another and towards one another to uncover and re-cover said exposure aperture;

respective fixed pivot-support posts project into respective pivot holes in said blades to support said blades to pivot away from and towards one another; and a single-piece driver has respective drive posts that project into drive slots in said blades and is supported for translation in a single forward direction to pivot said blades away from one another and for translation in a single reverse direction to pivot said blades towards one another;

wherein a face plate partially covers said blades and has respective translation-support slots, and said drive posts project into said translation-support slots to support said single-piece driver to translate in the forward and reverse directions.

23. A camera comprising:

an exposure aperture; and a dual-blade center-opening shutter having a pair of blades that pivot away from one another and towards one another to uncover and re-cover said exposure aperture;

respective fixed pivot-support posts project into respective pivot holes in said blades to support said blades to pivot away from and towards one another; and a single-piece driver has respective drive posts that project into drive slots in said blades and is supported for translation in a single forward direction to pivot said blades away from one another and for translation in a single reverse direction to pivot said blades towards one another;

wherein said single-piece driver is an L-shaped slider having a pair of substantially right-angle legs, and said drive posts project from respective ones of said legs into said drive slots in said blades.

24. A camera as recited in claim 23 wherein said L-shaped slider has a strike tab on one of said legs which when struck by a high energy striker translates said slider in the single forward direction to pivot said blades away from one another.

25. A camera as recited in claim 24 wherein said high energy lever is supported to be reset after striking said strike tab by returning past said strike tab, and said strike tab is resiliently mounted on one of said legs to allow said high energy lever to be returned past said strike tab by temporarily deflecting said strike tab without moving said L-shaped driver.

26. A camera comprising:

an exposure aperture;

a shutter having a pair of blades that are movable away from one another to open said exposure aperture and towards one another to re-close said exposure aperture;

a single-piece driver that is advanced to move said blades away from one another and is returned to move said blades towards one another;

a high energy striker supported to strike said single-piece driver to advance said single-piece driver; and a normally-open shutter-flash synchronization switch having a movable switch contact that is moved to close and reopen said shutter-flash synchronization switch;

wherein said single-piece driver is advanced against said switch contact to push said switch contact to close said shutter-flash synchronization switch, and a metal return spring is conductively connected to said switch contact and said electronic flash to urge said switch contact to move to reopen said shutter-flash synchronization switch and to urge said single-piece driver to return.

27. A camera comprising:

an exposure aperture;

a shutter having a pair of blades that are movable away from one another to open said exposure aperture and towards one another to re-close said exposure aperture;

a single-piece driver that is advanced to move said blades away from one another and is returned to move said blades towards one another; and a high energy striker supported to strike said single-piece driver to advance said single-piece driver;

wherein:

said single-piece driver is supported to translate in a single forward direction to move said blades away from one another and to translate in a single reverse direction to move said blades towards one another;

said blades are supported on respective fixed pivot-support posts to swing open away from one another and towards one another, and said single-piece driver has respective drive posts that project through respective slots in said blades to swing said blades about said pivot-support posts away from one another and towards one another when said single-piece driver is translated in the forward and reverse directions; and a face plate partially covers said blades and has respective translation-support slots, and said drive posts project into said translation-support slots to support said single-piece driver to translate in the forward and reverse directions.

28. A camera comprising:

an exposure aperture;

a shutter having a pair of blades that are movable away from one another to open said exposure aperture and towards one another to re-close said exposure aperture;

a single-piece driver that is advanced to move said blades away from one another and is returned to move said blades towards one another; and a high energy striker supported to strike said single-piece driver to advance said single-piece driver;

wherein:

said single-piece driver is supported to translate in a single forward direction to move said blades away from one another and to translate in a single reverse direction to move said blades towards one another;

said blades are supported on respective fixed pivot-support posts to swing open away from one another and towards one another, and said single-piece driver has respective drive posts that project through respective slots in said blades to swing said blades about said pivot-support posts away from one another and towards one another when said single-piece driver is translated in the forward and reverse directions; and said exposure aperture has a center-line, said blades when moved away from one another form a substantially rectangular opening having a center-point that is aligned with the center-line of said exposure aperture, and said fixed pivot-support posts are arranged relative one another and the center-point in order that a diagonal straight-line extending through opposite corners of the substantially rectangular opening intersects the center-point and said pivot-support posts.

29. A camera comprising:

an exposure aperture;

a shutter having a pair of blades that are movable away from one another to open said exposure aperture and towards one another to re-close said exposure aperture;

a single-piece driver that is advanced to move said blades away from one another and is returned to move said blades towards one another; and a high energy striker supported to strike said single-piece driver to advance said single-piece driver;

wherein said single-piece driver has a strike tab that is struck by said high energy lever to move said single-piece driver to move said blades away from one another and close said shutter-flash synchronization switch, said high energy lever is supported to be reset after striking said strike tab by returning past said strike tab, and wherein said strike tab is resiliently mounted on said single-piece driver to allow said high energy lever to be returned past said strike tab by temporarily deflecting said strike tab without moving said single-piece driver.

30. A camera comprising:

an exposure aperture;

a shutter having a pair of blades that are movable away from one another to open said exposure aperture and towards one another to re-close said exposure aperture;

a single-piece driver that is advanced to move said blades away from one another and is returned to move said blades towards one another;

a high energy striker supported to strike said single-piece driver to advance said single-piece driver; and a normally-open shutter-flash synchronization switch having a movable switch contact that is moved to close and reopen said shutter-flash synchronization switch;

wherein said single-piece driver is an L-shaped slider having a pair of substantially right-angle legs with respective shutter drive members positioned on said legs for moving said blades away from one another and towards one another and with a switch drive member positioned on only one of said legs for closing said shutter-flash synchronization switch.

31. The camera of claim 30 wherein said L-shaped slider has a strike tab that is struck by said high energy lever to advance said single-piece driver, said high energy lever is supported to be reset after striking said strike tab by returning past said strike tab, and wherein said strike tab is mounted on a resilient beam extending from said leg that has said switch drive member and one of said shutter drive members to allow said high energy lever to be returned past said strike tab by temporarily deflecting said strike tab without moving said L-shaped driver.

32. The camera of claim 30 wherein a face plate partly covers said blades and has respective translation-support slots, and said shutter drive members project into said translation-support slots to support said single-piece driver for translation to move said blades away from one another and close said shutter-flash synchronization switch and to permit said shutter-flash synchronization switch to reopen and move said blades towards one another.

33. A camera comprising:

an exposure aperture;

a dual-blade center-opening shutter having a pair of blades that pivot away from one another and towards one another to uncover and re-cover said exposure aperture;

respective fixed pivot-support posts project into respective pivot holes in said blades to support said blades to pivot away from and towards one another;

a single-piece driver has respective drive posts that project into drive slots in said blades, translates linearly in a forward direction to pivot said blades away from one another, and translates linearly in a reverse direction to pivot said blades towards one another; and a high energy striker supported to impact said single-piece driver to translate said single-piece driver in said forward direction.

34. The camera of claim 33 further comprising a normally open shutter-flash synchronization switch and wherein said single-piece driver translates in said forward direction against a switch contact of said synchronization switch to push said switch contact to close said shutter-flash synchronization switch and translates in said reverse direction to permit said shutter-flash synchronization switch to reopen.

35. The camera of claim 33 wherein said single-piece driver has a strike tab and said high energy lever impacts said strike tab to translate said single-piece driver in said forward direction, said high energy lever is supported to be reset after impacting said strike tab by returning past said strike tab, and wherein said strike tab is resiliently mounted on said single-piece driver to allow said high energy lever to be returned past said strike tab by temporarily deflecting said strike tab without moving said single-piece driver.

36. A camera comprising:

an exposure aperture;

a dual-blade center-opening shutter having a pair of blades that pivot away from one another and towards one another to uncover and re-cover said exposure aperture;

respective fixed pivot-support posts project into respective pivot holes in said blades to support said blades to pivot away from and towards one another;

a single-piece driver has respective drive posts that project into drive slots in said blades, moves in a forward direction to pivot said blades away from one another, and moves in a reverse direction to pivot said blades towards one another; and a high energy striker supported to impact said single-piece driver to translate said single-piece driver in said forward direction;

wherein said single-piece driver is an L-shaped slider having a pair of substantially right-angle legs with respective shutter drive members positioned on said legs for moving said blades away from one another and towards one another.

* * * * *